United States Patent [19]

Nagashima et al.

[11] Patent Number: 4,901,476
[45] Date of Patent: Feb. 20, 1990

[54] WINDOW PANE STRUCTURE

[75] Inventors: Setsuko Nagashima; Satoru Ugawa, both of Hadano, Japan

[73] Assignee: Nissan Motor Co., Ltd., Japan

[21] Appl. No.: 229,980

[22] Filed: Aug. 9, 1988

[30] Foreign Application Priority Data

Aug. 11, 1987 [JP]  Japan ................................. 62-199229
Aug. 11, 1987 [JP]  Japan ................................. 62-199230

[51] Int. Cl.$^4$ .............................................. E06B 7/16
[52] U.S. Cl. ....................................... 49/488; 49/501; 52/789; 52/813
[58] Field of Search ................. 49/488, 374, 501, 502; 52/789, 813, 821

[56] References Cited

U.S. PATENT DOCUMENTS

| 2,739,358 | 3/1956 | Kunkel ................... 49/488 |
| 3,641,707 | 2/1972 | Kellos ................. 49/488 X |
| 4,584,793 | 4/1986 | Okada et al. ............. 49/488 |
| 4,676,493 | 6/1987 | Helbig ................ 49/488 X |
| 4,775,570 | 10/1988 | Ohlenforst et al. ........ 49/488 |

FOREIGN PATENT DOCUMENTS 61-42322  3/1986  Japan .

Primary Examiner—Philip C. Kannan
Attorney, Agent, or Firm—Leydig, Voit & Mayer

[57] ABSTRACT

Disclosed herein is a window pane structure which has a considerable mechanical strength particularly at a peripheral portion thereof. The window pane structure comprises a laminated glass having a peripheral edge, and an elastic strip secured to and coextensive with the peripheral edge.

29 Claims, 3 Drawing Sheets

WINDOW PANE STRUCTURE

BACKGROUND OF THE INVENTION

1. Field of the Invention

The present invention relates in general to a window pane structure, and more particularly to a window pane structure which is suitable for a window pane of an automotive door.

2. Description of the Prior Art

Due to noted mechanical strength, some of the window panes of automotive doors hitherto proposed and put into practical use are constructed of a laminated glass which comprises two sheets of plate glass with a sheet of transparent resinoid sandwiched therebetween.

Usually, the window pane of laminated glass applied to the automotive door has its peripheral edge smoothly chamfered for preventing injury of a passenger and improving the external appearance of itself. However, the window pane of this type has a drawback that the chamfered peripheral edge of the pane lowers the strength, and thus such edge portion is liable to break upon application of a shock thereto. In fact, such portion is easily broken by a foreign object, such as a pick or the like, which a car thief may handle. Thus, sufficient theft protection has not been realized from such window pane.

SUMMARY OF THE INVENTION

It is, therefore, an object of the present invention to provide a window pane structure which is free of the above-mentioned drawback.

According to the present invention, there is provided a window pane structure of which peripheral edge is reinforced by an elastic strip secured thereto.

In accordance with one aspect of the present invention, there is provided a window pane structure which comprises a laminated glass having a peripheral edge; and an elastic strip bonded to the peripheral edge to extend along the same.

In accordance with another aspect of the present invention, there is provided a motor vehicle which comprises a body with an outer surface, the body having a door opening; a door with a window pane frame, the door being operatively received in the door opening; a window pane runner secured to the window pane frame; and a window pane structure which is slidable along the window pane runner, the window pane structure comprising a laminated glass having a peripheral edge, and an elastic strip bonded to the peripheral edge to extend along the same, the elastic strip having an outer surface which is flush with an outer surface of the laminated glass, wherein when the door assumes its closed position relative to the door opening, the outer surfaces of the elastic strip and the laminated glass become flush with the outer surface of the vehicle body.

DETAILED DESCRIPTION OF THE INVENTION

Figure 1:
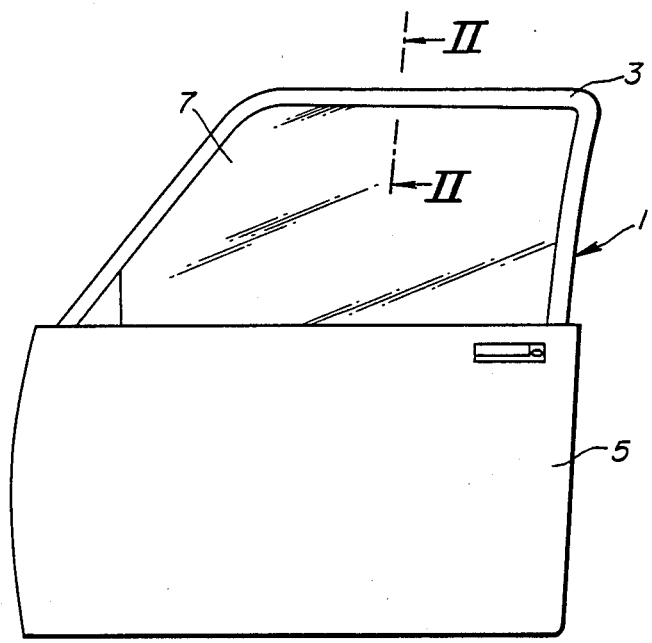
FIG. 1 is a side view of an automotive door in which a window pane structure of a first embodiment of the the present invention is used as an openable window pane.

Referring to FIG. 1, there is shown an automotive door 1 in which a window pane structure 7 of a first embodiment of the present invention is practically used. The door 1 comprises a door proper 5 on which a window frame 3 is mounted in a known manner. The window pane structure 7 is held by the door proper 5 in a manner to slide upward and downward along the window frame 3. That is, when brought up to its uppermost position, the window pane structure 7 closes fully the opening of the window frame 3, while, when brought down to its lowermost position, the same opens fully the window frame opening.

Figure 2:
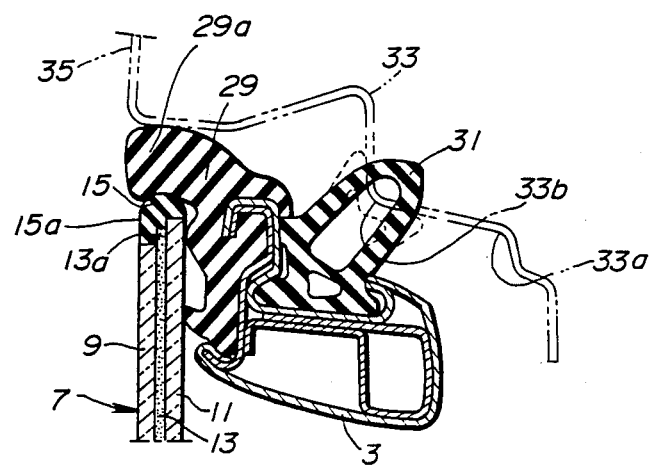
FIG. 2 is an enlarged sectional view taken along the line II—II of FIG. 1.

FIG. 2 is a sectional view taken along the line II—II of FIG. 1, which shows a completely closed condition of the door 1 wherein the door 1 is closed with the window pane structure 7 assuming its fully closed position. Denoted by numeral 33 is a vehicle body panel by which a door opening 33a is defined. The peripheral portion of the door opening 33a is formed with a stepped portion 33b. The window frame 3 has a weather strip 31 secured thereto. Upon closing of the door 1, a lip portion of the weather strip 31 is sealingly engaged with the stepped portion of the door opening 33a as will be understood from the lip portion illustrated by a broken line in the drawing. Denoted by 29 is a window pane runner constructed of an elastomer, which is secured to an outer side of the window frame 3. Both the runner 29 and the weather strip 31 are tightly held by respective retainers of metal which are secured to the window frame 3. For closing the opening of the window frame 3, the window pane structure 7 runs upward along the runner 29 and comes to the illustrated uppermost position. In this uppermost position, the peripheral edge of the window pane structure 7 presses an outwardly projected portion 29a of the runner 29 against the peripheral portion of the door opening 33a, as shown, so that undesirable play of the window pane structure 7 is suppressed.

In the following, the construction of the window pane structure 7 will be described in detail with reference to the drawings.

The window pane structure 7 comprises a laminated glass which, as is seen from FIG. 2, includes two sheets 9 and 11 of plate glass, and a sheet 13 of transparent resinoid sandwiched between the sheets 9 and 11.

The production steps of the laminated glass will be described with reference to FIGS. 3 and 4.

Figure 3:
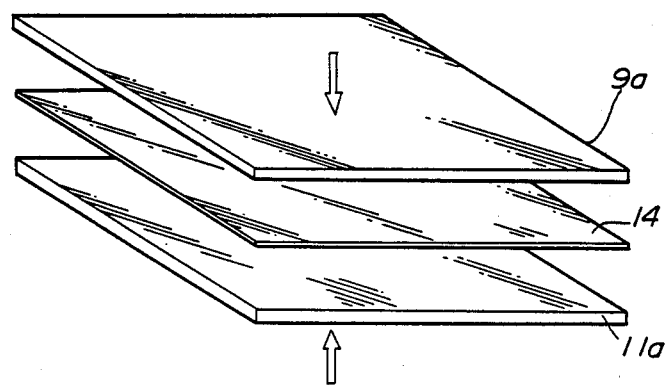
FIG. 3 is a perspective view of essential parts of a laminated glass, showing a process for producing the same.

First, as is seen from FIG. 3, two sheets 9a and 11a of green plate glass are arranged to put therebetween a separating paper 14, and then heat and pressure are applied to the glass sheets 9a and 11a to allow the same to have predetermined curvature. With this, curved glass sheets 9 and 11 are produced.

Figure 4:
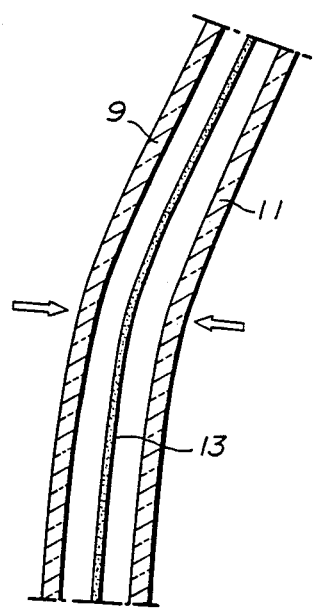
FIG. 4 is a sectional view of the essential parts of the laminated glass.

Then, as is seen from FIG. 4, the curved glass sheets 9 and 11 are put together having a sheet of resinoid 13 (such as polyvinyl butyral or the like) applied therebetween, and then heat is applied to them for achieving bonding therebetween.

As is seen from FIG. 2, the laminated glass thus produced has a stepped peripheral edge which comprises respective edges of the curved glass sheets 9 and 11 and the resinoid sheet 13. The stepped edge is automatically produced upon curving of the green sheets 9a and 11a so long as they have had the same size. Of course, such stepped edge may be provided by varying the sizes of the green sheets 9a and 11a. For the reason which will be clarified hereinafter, it is important to have the peripheral edge 13a of the resinoid sheet 13 exposed or projected to the outside of the laminated glass.

As is seen from FIG. 2, the stepped peripheral edge of the lamnated glass is covered or hemmed with an elastic strip 15. The elastic strip 15 is bonded to the peripheral edge by means of a suitable adhesive. The elastic strip 15 has an outer surface 15a which is flush with the outer surface of the glass sheet 9.

With the steps as described hereinabove, the window pane structure 7 of the first embodiment is produced, which comprises the laminated glass having the peripheral edge thereof hemmed with the elastic strip 15.

In the following discussion, advantages of the window pane structure 7 will be described.

First, because of provision of the elastic strip 15, the mechanical strength of the peripheral edge portion of the laminated glass is increased. Thus, even when a considerable force is applied to the peripheral edge of the window pane structure 7 by for example a pick handled by a car thief, the same is protected from being broken. In fact, only cracking is produced, but formation of such a large hole as permitting passing of a hand therethrough is prevented. This improves the anti-theft performance of the window pane structure 7.

Second, because the peripheral edge of the laminated glass is hemmed woth the elastic strip 15, the external appearance of the window pane structure 7 is improved. Furthermore, by the same reason, the window pane structure 7 is protected from water penetration through the stepped edge portion.

Third, since the peripheral edge of the laminated glass is equipped with the elastic strip 15, the engagement between the window pane structure 7 and the projected portion 29a of the window pane runner 29 (see FIG. 2) is positively achieved. Thus, the undesired play of the window pane structure 7 in the fully closed position is completely suppressed.

Fourth, since the outer surface of the elastic strip 15 is flush with the outer surface of the laminated glass, a so-called flush surface construction of a vehicle body is available. For achieving this construction, the window pane structure 7 should be so arranged that when the door 1 is in its completely closed condition, the structure 7 becomes flush with an outer surface 35 of the associated vehicle body, as is seen from FIG. 2.

Referring to FIGS. 5, 6, 7 and 8, there are respectively shown second, third, fourth and fifth embodiments of the present invention. In these embodiments, the elastic strip 15 has a groove (no numeral) for receiving therein the peripheral edge of the glass sheet 11.

Figures 5, 6, 7, 8:
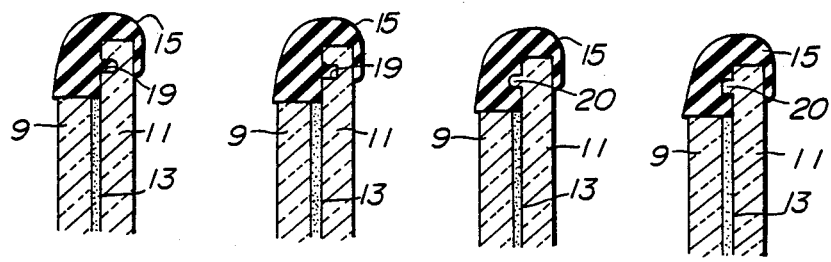
FIGS. 5 to 13 are sectional views of the peripheral edge portions of window pane structures of second to tenth embodiments of the present invention.

Furthermore, in the second and third embodiments of FIGS. 5 and 6, the peripheral edge portion of the glass sheet 11 is formed with a small groove with which a tongue or ridge 19 of the elastic strip 15 is engaged. The groove has a semicircular cross section (in FIG. 5) or a rectangular cross section (in FIG. 6).

In the fourth and fifth embodiments of FIGS. 7 and 8, such small groove is formed in the elastic strip 15 and a tongue or ridge 20 formed on the glass sheet 11 is engaged with the groove.

In the second to fifth embodiments, the connection of the elastic strip 15 to the laminated glass is much assured because of a so-called latched engagement achieved by the groove and the ridge.

Figures 9, 10:
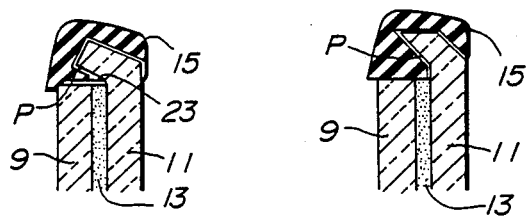

Referring to FIGS. 9 and 10, there are shown sixth and seventh embodiments of the present invention. In these embodiments, the peripheral edge portion of the glass sheet 11 is bent toward the other glass sheet 9, as shown. That is, in the sixth embodiment of FIG. 9, the peripheral edge portion of the glass sheet 11 is largely bent toward the other glass sheet 9, while, in the seventh embodiment of FIG. 10, the same is slightly bent. The elastic strip 15 has a groove into which the bent peripheral edge portion of the glass sheet 11 is received. Because of a so-called hooked connection "P" achieved by the bent peripheral edge portion and the groove, the connection of the elastic strip 15 to the laminated glass is assuredly made. In case of the sixth embodiment of FIG. 9, it is preferable to apply a suitable adhesive to the portion indicated by numeral 23.

Figures 11, 12, 13:
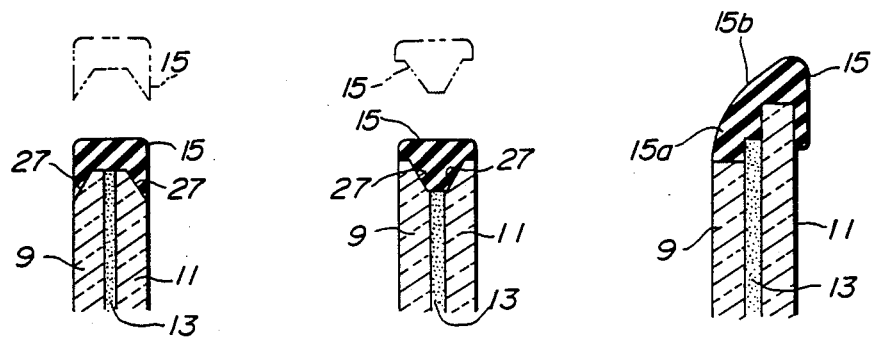

Referring to FIGS. 11 and 12, there are shown eighth and ninth embodiments of the present invention. In the eighth embodiment of FIG. 11, the peripheral edge of the laminated glass is shaved to have tapered sides 27 and 27, while, in the ninth embodiment of FIG. 12, the peripheral edge of the laminated glass is formed with a groove of generally V-shaped cross section. The tapered side walls of the groove are designated by numerals 27 and 27. The elastic strip 15 bonded to the grooved peripheral edge of the laminated glass has a cross section matching with that of the peripheral edge, as shown.

Referring to FIG. 13, there is shown a tenth embodiment of the present invention. In this embodiment, the elastic strip 15 has at its outboard side a tapered surface 15b.

What is claimed is:

1. A window pane structure comprising:
   a laminated glass having inner and outer surfaces and a peripheral edge; and
   an unitary elastic strip secured to and coextensive with said peripheral edge and having at least one surface which is flush with one of said glass surfaces.

2. A window pane structure as claimed in claim 1, wherein said laminated glass comprises two sheets of plate glass and a sheet of transparent resinoid sandwiched between said two sheets.

3. A window pane structure as claimed in claim 2, wherein the peripheral edge of said laminated glass is formed with a stepped portion defined by respective peripheral edges of the two sheets plate glass and the transparent resinoid sheet.

4. A window pane structure as claimed in claim 3, wherein said elastic strip has a groove into which a peripheral edge of one of said two plate glass sheets is received.

5. A window pane structure as claimed in claim 4, wherein said elastic strip is formed at one side with a tapered surface.

6. A window pane structure as claimed in claim 4, further comprising retaining means which promotes connection between said peripheral edge of the laminated glass and said elastic strip.

7. A window pane structure as claimed in claim 6, wherein said retaining means comprises:
   a groove formed in one of said two plate glass sheets; and a tongue integrally formed on said elastic strip, said tongue engaging said groove.

8. A window pane structure as claimed in claim 6, wherein said retaining means comprises:
a groove formed in said elastic strip; and
a tongue integrally formed on at least one of said plate glass sheets, said tongue engaging said groove.

9. A window pane structure as claimed in claim 3, wherein peripheral edge of one of the two plate glass sheets is bent toward the other of the plate glass sheets and received in a groove formed in said elastic strip.

10. A window pane structure as claimed in claim 9, wherein an adhesive is applied to at least a portion where the transparent resinoid sheet and said elastic strip contact.

11. A window pane structure as claimed in claim 1, wherein the peripheral edge of said laminated glass is tapered and is received in a groove commensurate in shape to the peripheral edge.

12. A window pane structure as claimed in claim 1, in which the peripheral edge of said laminated glass has a groove into which a commensurately shaped portion of said elastic strip is snugly received.

13. A window pane structure as claimed in claim 1 wherein said at least one surface of said elastic strip is an outer surface which is flush with an outer surface of said laminated glass.

14. A motor vehicle comprising:
a body with an outer surface, said body having a door opening;
a door with a window pane frame, said door being operatively received in said door opening;
a window pane runner secured to said window pane frame; and
a window pane structure which is slidable along said window pane runner, said window pane structure comprising a laminated glass having inner and outer surfaces and a peripheral edge, and an unitary elastic strip secured to and coextensive with said peripheral edge, said elastic strip having an outer surface which is flush with an outer surface of said laminated glass,
wherein when said door assumes its closed position relative to said door opening, said outer surfaces of said elastic strip and said laminated glass become flush with said outer surface of the vehicle body.

15. A motor vehicle as claimed in claim 14, in which said elastic strip has a tapered surface near said outer surface thereof.

16. A window pane structure comprising:
a laminated glass having a peripheral edge formed with a stepped portion; and
an elastic strip secured to and coextensive with said peripheral edge.

17. A window pane structure as claimed in claim 16 wherein the outer surface of said elastic strip has an outer surface which is flush with an outer surface of said laminated glass.

18. A window pane structure as claimed in claim 16, wherein said laminated glass comprises two sheets of plate glass and a sheet of transparent resinoid sandwiched between said two sheets.

19. A window pane structure as claimed in claim 18, wherein a peripheral edge of one of the two plate glass sheets is bent toward the other of the plate glass sheets and received in a groove formed in said elastic strip.

20. A window pane structure as claimed in claim 19, wherein an adhesive is applied to at least a portion where the transparent resinoid sheet and said elastic strip contact.

21. A window pane structure as claimed in claim 18, wherein said elastic strip has at least one surface which is flush with a surface of one of said two plate glass sheets.

22. A window pane structure as claimed in claim 21, wherein the peripheral edge of said laminated glass is tapered and is received in a groove commensurate in shape to the peripheral edge.

23. A window pane structure as claimed in claim 21, in which the peripheral edge of said laminated glass has a groove into which a commensurately shaped portion of said elastic strip is snugly received.

24. A window pane structure as claimed in claim 21, wherein said elastic strip has a groove into which a peripheral edge of one of said two plate glass sheets is received.

25. A window pane structure as claimed in claim 24, in which said elastic strip is formed at one side with a tapered surface.

26. A window pane structure as claimed in claim 24, further comprising retaining means which promotes connection between said peripheral edge of the laminated glass and said elastic strip.

27. A window pane structure as claimed in claim 26, wherein said retaining means comprises:
a groove formed in one of said two plate glass sheets; and
a tongue integrally formed on said elastic strip, said tongue engaging said groove.

28. A window pane structure as claimed in claim 26, wherein said retaining means comprises:
a groove formed in said elastic strip; and
a tongue integrally formed on one of said plate glass sheets, said tongue engaging said groove.

29. A window pane structure comprising:
a laminated glass having a peripheral edge, said laminated glass including two sheets of plate glass and a sheet of transparent resinoid sandwiched between said two sheets, said peripheral edge of said laminated glass being formed with a stepped portion defined by respective peripheral edges of said two sheets of plate glass and said sheet of transparent resinoid; and
an elastic strip secured to and coextensive with said peripheral edge.

* * * * *